United States Patent [19]

Gordon et al.

[11] 4,403,024
[45] Sep. 6, 1983

[54] BATTERY SEPARATOR

[75] Inventors: Geoffrey H. Gordon, Medford; John H. Gillespie, Stow, both of Mass.

[73] Assignee: W. R. Grace & Co., Cambridge, Mass.

[21] Appl. No.: 338,381

[22] Filed: Jan. 11, 1982

[51] Int. Cl.³ .............................................. H01M 2/18
[52] U.S. Cl. ..................................... 429/146; 264/41; 264/104; 264/284
[58] Field of Search ............... 429/130, 142, 143, 146, 429/147; 264/41, 104, 284

[56] References Cited

U.S. PATENT DOCUMENTS

| | | | |
|---|---|---|---|
| 686,886 | 11/1901 | Chamberlain | 429/143 |
| 717,549 | 1/1903 | Decker et al. | 429/146 |
| 3,205,098 | 9/1965 | Hall et al. | 136/145 |
| 3,798,294 | 3/1974 | Hollenbeck | 246/41 |
| 4,000,352 | 12/1976 | Hollenbeck et al. | 429/147 |
| 4,072,802 | 2/1978 | Murata et al. | 429/147 |
| 4,153,759 | 5/1979 | Murata et al. | 429/147 |
| 4,228,225 | 10/1980 | O'Rell et al. | 429/147 |

FOREIGN PATENT DOCUMENTS

1510336 6/1975 United Kingdom .
1568776 11/1977 United Kingdom .

OTHER PUBLICATIONS

U.S. Patent Application, Ser. Nos. 240,241, 240,242, filed Mar. 4, 1981, Inventors: D. D. O'Reil et al., Entitled: BATTERY SEPARATOR—5943, 5944.

Primary Examiner—Donald L. Walton
Attorney, Agent, or Firm—Edward J. Hanson, Jr.; William L. Baker; Carole F. Barrett

[57] ABSTRACT

A battery separator having a planar back web and a plurality of ribs on at least one face with the ribs being sinusoidal like in configuration.

8 Claims, 6 Drawing Figures

BATTERY SEPARATOR

This invention relates to battery separators and especially to battery separators having a planar back web and a plurality of ribs on at least one face thereof.

One object of the present invention is to provide a high performance battery separator that has a planar back web and a plurality of ribs on at least one face thereof.

Another object of the present invention is to provide a high performance battery separator that can be employed with a very wide variety of battery plate configurations.

Yet another object of the present invention is to provide an electric storage battery of high performance and long life.

A still further object of the present invention is to provide a battery separator that is easy to make and low in cost.

Another object of the present invention is to provide a battery separator with good gas relief properties and good properties for minimizing acid density stratification in the vertical plane.

SUMMARY OF THE INVENTION

By an aspect of the invention a battery separator is provided having a substantially planar back web with two opposed faces. Each of the faces has a top edge and a bottom edge. At least one face has a plurality of ribs on it that are sinusoidal like in configuration and at least 75% continuous in extending from the bottom edge to the top edge of the battery separator face and isolated on the back web from the adjacent rib. To provide superior operation of the battery separator the invention provides that the sinusoidal like ribs have no more than one complete wave per 45 millimeters in vertical distance. The preferred ribs have a deflection from the vertical of about 5 to about 25° and a total horizontal deflection distance of about 3 to about 50 millimeters. The ribs are preferably nested. A characteristic of the preferred battery separator of the present invention is that no line can be drawn vertically from the bottom edge to the top edge of the face having the sinusoidal like ribs without crossing at least one of the ribs at least twice and will not pass through more than 4 ribs.

By another aspect of the present invention a method of producing the battery separator of the present invention is provided and it is important for superior operation of this method, that the battery separator be shaped from a plastic composition containing at least 30% plasticizer by calendering and, after the shaping, extracting the majority of the plasticizer from the battery separator.

DESCRIPTION OF THE PREFERRED EMBODIMENT

Figure 1:
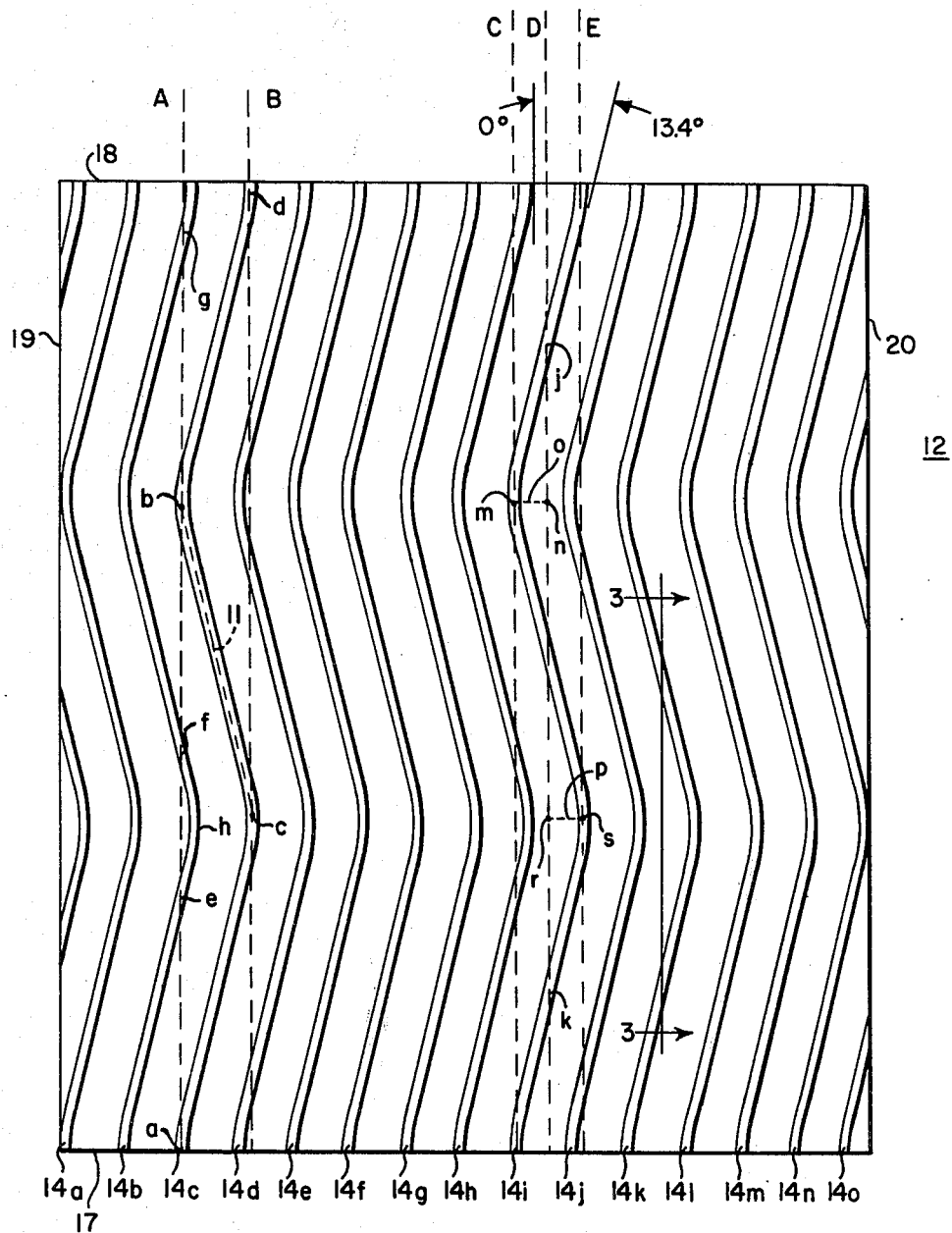
FIG. 1 is a diagrammatic plan view of a battery separator of the present invention.
Figure 2:
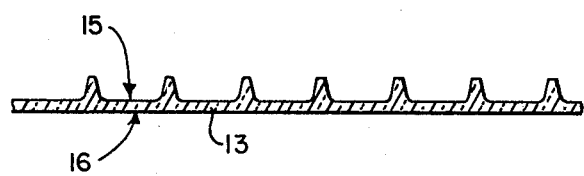
FIG. 2 is a sectional view on line 2—2 of FIG. 1.
Figure 3:
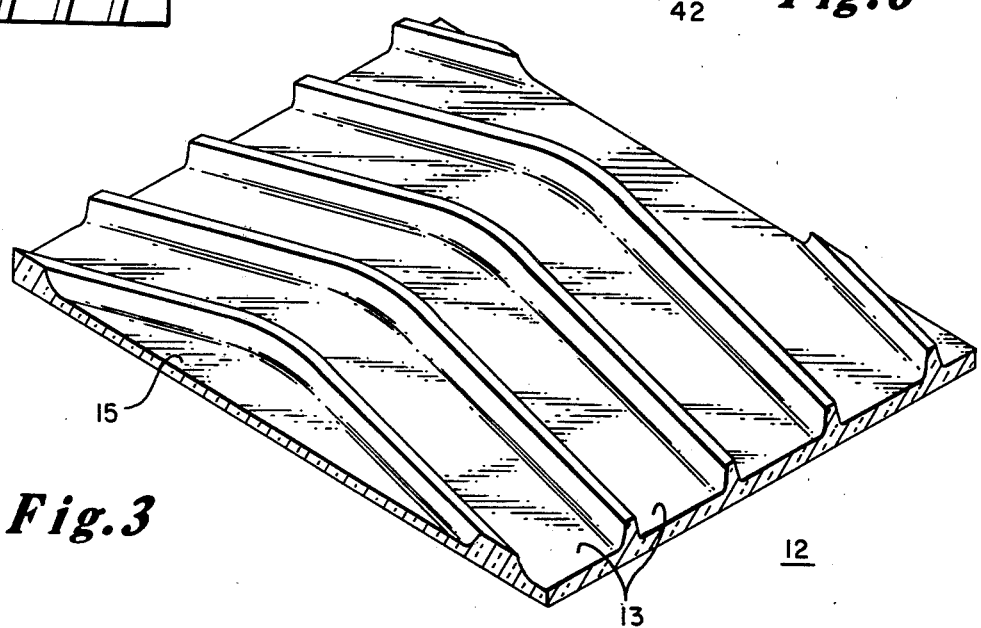
FIG. 3 is a diagrammatic perspective view of the battery separator of FIG. 1.
Figure 4:
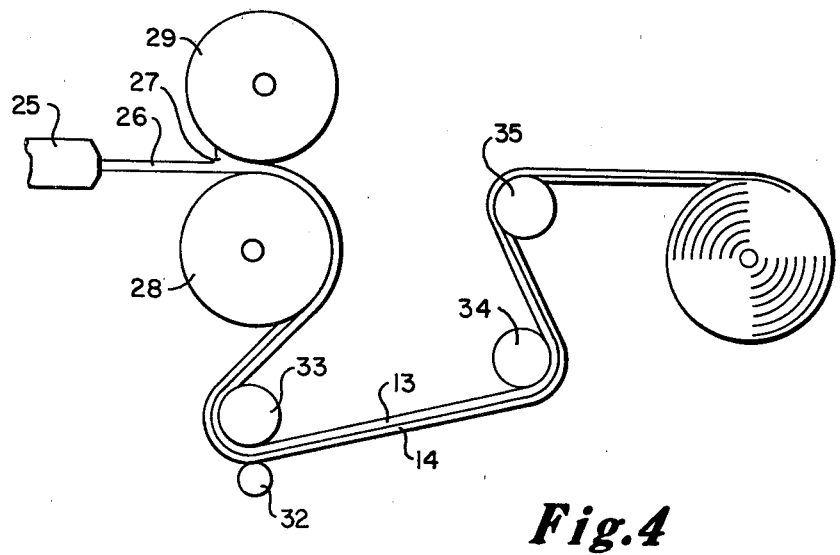
FIG. 4 is a diagrammatic representation of a system for producing battery separators according to the present invention.

Referring to FIGS. 1, 2 and 3, a battery separator 12 of the present invention may be seen with its planar back web and nested sinusoidal like ribs 14a—14o. The face of the back web and the nested sinusoidal like ribs 14a—14o form one face 15 of the battery separator. The other face 16 of the battery separator may be flat as shown, or it can have various configurations of raised areas or depressed areas on it or it can have a rib construction on it according to face 15 of the present invention which face 15 shall be further described hereinafter.

It is a requirement of the present invention that the back web 13 be a planar sheet as shown. Thus it may be seen that the back web 13 dimension lies essentially in a single plane in the vertical and the horizontal dimensions. Obviously straight or planar are relative terms and few if any things are truly straight or planar. Thus the back web is substantially planar, allowing for the imperfections of manufacture, warping of materials and the like.

The battery separator has a bottom edge 17, a top edge 18 and two side edges 19 and 20. Each of these edges could, of course, be cut on a bias. The orientation of the bottom and top of the battery separator refers to the orientation that the battery separator would have when properly installed in an electrical storage battery.

The sinusoidal like ribs 14 extend from the bottom edge of the face 15 of the battery separator 12 to the top edge of the battery separator 12. Each rib may be seen to be isolated on the back web from adjacent ribs. For instance rib 14c is isolated on the back web from adjacent rib 14b and from adjacent rib 14d.

The sinusoidal like ribs are shown as being continuous as they extend from the bottom edge 17 to the top edge 18 of the battery separator face 15. This is the preferred mode. However, the mere breaking of the continuity of the rib at various locations along its length would not be expected to be greatly harmful and could possibly yield some benefits. Thus the ribs should be at least 75%, more preferably 90%, and most preferably 100% continuous as they extend from the bottom edge 17 to the top edge 18 of the battery separator face 15.

Figure 5:
FIG. 5 is a diagrammatic plan view of a small section of a battery separator of the present invention showing a different rib configuration.

By sinusoidal like it is meant to include not only even symmetrical curving waves such as are illustrated in FIGS. 1-3. Zig-zag like waves such as are illustrated in FIG. 5 as well as other curvature shapes are also to be included. Measurements are made in accordance with what is considered to be standard engineering practice, i.e. using the imaginary center line of the rib.

It is also important to the superior operation of the battery separator that the ribs have no more than one complete wave per 45 millimeters in vertical distance more preferably per 75 millimeters in vertical distance and most preferably per 100 millimeters in vertical distance. It may be seen that for rib 14c the portion between points a and b is a wave and the portion between points c and d is a reverse wave each of which is 165 millimeters in vertical distance. Furthermore for a battery separator with superior operation, a line drawn vertically from the bottom edge to the top edge of the face of the battery separator will not pass through more than 4 ribs. A line drawn vertically from the bottom edge to the top edge of the face of the battery separator 12 in FIG. 1 will not pass through more than 2 ribs.

It is also important to superior operation that the sinusoidal like ribs have a deflection from the vertical of 5° to 25°, more preferably 10° to 15°. The deflection from the vertical is measured by drawing a straight line between adjacent reverse peaks on a rib and measuring the angle of this line from the vertical. Such a line would be the phantom line 11 drawn between peaks c and b on rib 14c.

It is also important if the battery separator is going to have universal applicability that each rib has a total horizontal deflection distance of 3 to 50 millimeters (mm), more preferably 10 to 25 millimeters and most preferably 14 to 20 millimeters. It is important that the total horizontal deflection distance be at least approximately 10 millimeters wide so that when the battery separator is used with many of the conventional tubular plates each rib will bridge the distance between adjacent tubes. The tubes are frequently 9 to 10 millimeters in their width or horizontal dimension. It is also apparent that as shown in FIG. 1 the horizontal deflection distance is equal to twice the amplitude of the wave of the sinusoidal like rib. Thus as shown in FIG. 1 lines C, D and E define the boundaries of one wave from j to k with D being the axis. The amplitude of the wave is the distance o between m and n and also the distance p between r and s.

Adjacent ribs are preferably nested by which it is meant that a vertical line such as phantom line A drawn along one vertical extreme of displacement of a given rib such as 14c and engaging the vertical extreme at two points will cross an adjacent rib such as 14b as may be seen at points e, f and g. Preferably the ribs are in phase, equidistance from adjacent ribs throughout their lengths and symmetrical.

For the best operation of the battery separator the nesting should be by no more than ¾ the horizontal deflection distance, more preferably ½ the horizontal deflection distance. By nesting by no more than ¾ the horizontal deflection distance it is meant the distance the rib 14b passes through the phantom line A as seen at point h as compared to the horizontal deflection distance of the rib 14c as measured between phantom lines A and B. Thus if the nesting was ¾ the horizontal deflection distance, the ribs would, if symmetrically even as is preferred, be separated from adjacent ribs by ¼ the horizontal deflection distance.

It is also important to superior operation of the battery separator that it not be possible to draw a vertical line from the bottom edge 17 to the top edge 18 of the face 15 of the battery separator 12 without crossing at least one of the ribs at least twice. It may be seen that in FIG. 1 phantom line A crosses rib 14b 3 times and phantom line B crosses rib 14c 2 times.

The battery separator of the present invention can be manufactured by various means presently known in crude fashion that may be further refined. For example, a filled natural rubber in a water slurry could be poured into a shaped mold. Then the rubber could be cured and the water driven off leaving a porous battery separator with its shape set. The battery separator could then be removed from the mold.

By far the preferred and truly practical manner of manufacturing the battery separator of the present invention involves an inventive aspect of the present invention and is the calendering method. This procedure is basically revealed in U.S. Pat. Nos. 3,917,772 and 3,798,294 both of which are incorporated-by-reference in this application. The preferred composition for use in the present invention is that of U.S. Pat. No. 3,351,495 which is also incorporated-by-reference in this application. In an important aspect, for good calendering performance the composition used to manufacture the battery separator should include at least 30% by volume of a plasticizer, which may be an oil as taught in U.S. Pat. No. 3,351,495 but also could be other agents such as petroleum waxes by themselves or with such oil or phthalate plasticizers. Preferably the other materials in the composition, present in substantial volume, are plastic materials, particularly the thermoplastics and especially the polyolefins and particularly preferred is polyethylene; and an inert filler.

The method of calendering constitutes extruding the composition to be calendered from extruder 25 as a sheet 26 and maintaining a slight surplus 27 at the nip of calender rolls 28 and 29. Calender roll 28 has the pattern of grooves etched or engraved in its calendering surface to produce the ribs 14 as shown in FIG. 1. This calendering configuration has been described with respect to FIGS. 1-3 and thus will not be repeated here. Sizing rolls 32 and 33 size the overall thickness of the battery separator. Rolls 34 and 35 are illustrative of additional rolls that may be present either to handle the conveyance of the battery separator web or also to enhance its cooling. The still plasticized sheet is shown rolled up at 36 but the web could go directly to a station for extraction of the plasticizer and/or cutting to the final battery separator size.

The battery separator of the present invention is utilized in an electric storage battery, positioned between the positive plate and the negative plate. The sinusoidal like ribs if present only on one face of the battery separator would preferably be engaged against the positive active material or positive plate. If both faces of the battery separator have the sinusoidal like ribs on them but the ribs on one face are of greater height in projection above or from the back web, then that face of the battery separator having the greater rib height would usually preferably be engaged against the positive active material while the other side of the battery separator would be engaged against the negative active material or negative plate. There can be material between the battery separator and the battery plate or active material. Such a material would for example be the well known glass mat or the material forming the tubes for a tubular plate.

Figure 6:
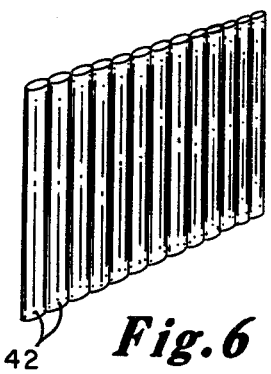
FIG. 6 is a diagrammatic perspective view of a series battery plate tubes aligned in a battery plate.

As mentioned earlier in the present application, the present battery separator in its preferred form is considered to be a universal separator because it is not only ideally suited to use with the conventional flat plate lead acid battery designs presently being widely used in the United States but especially suited for use with the tubular battery plate designs so commonly used in Europe. An example of such a battery plate is shown in U.S. Pat. No. 3,725,130. FIG. 6 of the present application illustrates a multiple pocket or tube belt configured as it will be when filled with active material. The tubes 42 are usually a conventional 7 to 15 millimeters wide horizontally in line with the battery plate. It is apparent that because of the curvature of each tube the face of a battery separator engaged against the tube will tend to be warped into the space between the outer extensions of adjacent tubes stressing the battery separator. It is the minimizing of such stressings that the battery separator of the present invention is particularly good at resisting.

The battery separator is positioned in the battery adjacent to the plurality of battery tubes, which tubes are aligned horizontally in a tubular battery plate as shown in FIG. 6. The 7 to 15 millimeters width of the individual tubes is to be read in alignment with the horizontal alignment of the battery tubes.

Furthermore the sinusoidal like configuration gives good resistance to fracture of the battery separator during cycling of the battery as the plates expand and contract. During cycling there is considerable stress trying to pull the separator apart or cause fracturing. The battery separator also lends itself to forms that may be folded and sealed.

It will be obvious to those skilled in the art that various changes and modifications may be made in the invention without departing from its true spirit and scope. It is, therefore, aimed in the appended claims to cover all such equivalent variations as fall within the true spirit and scope of the invention.

What is claimed is:

1. A battery separator comprising a substantially planar back web having two opposed faces, each of said faces having a top edge and a bottom edge and a plurality of ribs on at least one of said faces being sinusoidal like in configuration, at least 75% continuous in extending from said bottom edge to said top edge of said battery separator face and isolated on said back web from one another wherein no line can be drawn vertically from the bottom edge to the top edge of said face having said sinusoidal like ribs without crossing at least one of said ribs at least twice and not passing through more than 4 ribs and wherein said ribs have no more than one complete wave per 45 millimeters in vertical distance, and have a deflection from the vertical of about 5° to about 25° and a total horizontal deflection distance of about 3 to about 50 millimeters wherein at least some of said ribs are nested with an adjacent rib.

2. The battery separator of claim 1 wherein said sinusoidal like ribs are at least 90% continuous in extending from said bottom edge to said top edge of said battery separator face, have a deflection from the vertical of about 10° to about 15°, a total horizontal deflection distance of about 10 to about 25 millimeters, are nested by no more than about ¾ the horizontal deflection distance and have no more than one complete wave per 75 millimeters in vertical distance.

3. The battery separator of claim 2 wherein said battery separator is positioned in a battery adjacent to a plurality of battery tubes, said tubes aligned horizontally in a tubular battery plate and each of said tubes having an individual tubular width of about 7 to about 15 millimeters in alignment with the horizontal alignment of said battery tubes.

4. The battery separator of claim 1 wherein said ribs have no more than one complete wave per 100 millimeters in vertical distance, are nested by no more than ½ the horizontal deflection distance and have a total horizontal deflection distance of about 14 to about 20 millimeters.

5. A method for producing a battery separator comprising:
   (1) shaping a plastic battery separator producing composition into substantially planar back web having two opposed faces each of said faces having a top edge and a bottom edge;
   (2) forming at least a plurality of sinusoidal like ribs on at least one of said faces such that no more than one complete wave is formed per 45 millimeters in vertical distance such that said ribs are formed with a deflection from the vertical of about 5° to about 25° and a total horizontal deflection distance of about 3 to about 50 millimeters and at least some of said ribs are nested with an adjacent rib;
   (3) extending said ribs at least 75% continuously from said bottom edge to said top edge of said battery separator face;
   (4) isolating said ribs from one another such that no line can be drawn vertically from the bottom edge to the top edge of said face having sinusoidal like ribs without crossing at least one of said ribs at least twice and not passing through more than 4 ribs; and
   (5) completing the production of said battery separator.

6. The method of claim 5 wherein said plastic composition comprises at least 30% plasticizer and said shaping comprises calendering and said completing the production comprises extracting the majority of said plasticizer from said battery separator producing composition.

7. The method of claim 5 wherein said sinusoidal like ribs are formed at least 90% continuous in extending from said bottom edge to said top edge of said battery separator face, having a deflection from the vertical of about 10° to about 15°, a total horizontal deflection distance of about 10 to about 25 millimeters, nested by no more than about ¾ the horizontal deflection distance and have no more than one complete wave per 75 millimeters in vertical distance.

8. The method of claim 5 wherein said sinusoidal like ribs have no more than one complete wave per 100 millimeters in vertical distance and are nested by no more than about ½ the horizontal deflection distance and have a total horizontal deflection distance of about 14 to about 20 millimeters.

* * * * *